United States Patent
Yasui

(10) Patent No.: US 9,457,780 B2
(45) Date of Patent: Oct. 4, 2016

(54) NEGATIVE PRESSURE TYPE BOOSTER DEVICE

(71) Applicant: ADVICS CO., LTD., Kariya (JP)

(72) Inventor: Yoshiyuki Yasui, Kariya (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 287 days.

(21) Appl. No.: 14/310,398

(22) Filed: Jun. 20, 2014

(65) Prior Publication Data

US 2014/0373709 A1 Dec. 25, 2014

(30) Foreign Application Priority Data

Jun. 21, 2013 (JP) .................................. 2013-130829

(51) Int. Cl.
| | |
|---|---|
| *F15B 9/10* | (2006.01) |
| *B60T 13/52* | (2006.01) |
| *B60T 13/567* | (2006.01) |
| *B60T 13/569* | (2006.01) |

(52) U.S. Cl.
CPC .............. *B60T 13/52* (2013.01); *B60T 13/569* (2013.01); *B60T 13/5675* (2013.01)

(58) Field of Classification Search
CPC .. B60T 13/52; B60T 13/567; B60T 13/5675; B60T 13/569
See application file for complete search history.

(56) References Cited

U.S. PATENT DOCUMENTS

| | | | |
|---|---|---|---|
| 6,516,702 B1 * | 2/2003 | Stephane | B60T 13/567 91/367 |
| 7,318,370 B2 * | 1/2008 | Samson | B60T 13/5675 91/376 R |
| 7,673,554 B2 | 3/2010 | Raimbault et al. | |

FOREIGN PATENT DOCUMENTS

JP 2008-024293 A 2/2008

* cited by examiner

*Primary Examiner* — Michael Leslie
(74) *Attorney, Agent, or Firm* — Buchanan Ingersoll & Rooney PC

(57) ABSTRACT

Provided is a negative pressure type booster device, in which a diaphragm of a movable partition wall has, in a penetration portion through which a tie rod bolt hermetically penetrates, a tubular guide portion that abuts against an annular flange portion provided on the tie rod bolt during forward movement of a power piston, and an annular sealing portion that is provided in the rear of the guide portion to block communication between a negative pressure chamber and a variable pressure chamber. The guide portion is provided with a communication portion through which a negative pressure chamber side space exposed by the front surface of the sealing portion communicates with the negative pressure chamber, even in a state in which the guide portion abuts against the annular flange portion.

5 Claims, 4 Drawing Sheets

NEGATIVE PRESSURE TYPE BOOSTER DEVICE

TECHNOLOGICAL FIELD

The present invention relates to a negative pressure type booster device that is a component of a brake device applied to an automobile.

BACKGROUND DISCUSSION

As one of the negative pressure type booster devices, for example, JP 2008-24293 A discloses a negative pressure type booster device that has a booster shell formed by a front shell and a rear shell, a power piston that divides the interior of the booster shell into a negative pressure chamber and a variable pressure chamber and that is movable in a front-back direction, and a tie rod bolt that hermetically penetrates through the booster shell and a movable partition wall provided in the power piston and that is fixed to the booster shell, the negative pressure chamber being configured to be formed between the front shell and the power piston and connected to a negative pressure source, and the variable pressure chamber being configured to be formed between the rear shell and the power piston and connected to the negative pressure chamber or atmosphere.

In the negative pressure type booster device disclosed in the above-described JP 2008-24293 A, the tie rod bolt hermetically penetrates through a diaphragm as one component of the movable partition wall, and in order to ensure sealing performance of the penetration portion, an annular sealing portion and a tubular guide portion are provided on the diaphragm. In addition, the tubular guide portion permits the required sealing performance to be obtained in the annular sealing portion, by suppressing tilting of the sealing portion with respect to the tie rod bolt such that the annular sealing portion appropriately engages with an outer circumference of the tie rod bolt.

In the negative pressure type booster device disclosed in above-described JP 2008-24293 A, the tubular guide portion is provided on the negative pressure chamber side (front side) with respect to the annular sealing portion. For this reason, during a forward full stroke of the power piston (during movement), there is a concern that the tubular guide portion provided in the diaphragm abuts against an annular member provided in the front shell (a member that hermetically seals between the front shell and the tie rod bolt). In this case, at the time of seal inspection of the annular sealing portion (specifically, inspection that checks the sealing performance by applying a differential pressure to the negative pressure chamber and the variable pressure chamber in the forward full stroke state of the power piston), there is a concern that the sealing performance is also obtained at a contact portion between the guide portion and the annular member, and thus it may not be possible to accurately inspect the sealing performance of the annular sealing portion.

As a consideration for the above-described sealing inspection accuracy, it is also possible to set the tubular guide portion provided in the diaphragm so as not to abut against the annular member provided in the front shell (specifically to increase the width (length in the front-back direction) of the booster shell or to decrease the length in the front-back direction of the guide portion), in the forward full stroke state of the power piston. In this case, however, the booster device increases in size in the front-back direction or the function of the guide portion deteriorates, and thus the sealing performance may be impaired.

SUMMARY

The present invention was made in view of the above-described circumstances (enabling the accuracy of the above-described seal inspection to be improved without causing an increase in size of the booster device or a decline in function of the guide portion). According to the present invention, there is provided a negative pressure type booster device which has a booster shell formed by a front shell and a rear shell, a power piston that divides the interior of the booster shell into a negative pressure chamber and a variable pressure chamber and that is movable in a front-back direction, and a tie rod bolt that hermetically penetrates through the booster shell and a movable partition wall included in the power piston and that is fixed to the booster shell, the negative pressure chamber being configured to be formed between the front shell and the power piston and connected to a negative pressure source, and the variable pressure chamber being configured to be formed between the rear shell and the power piston and connected to the negative pressure chamber or atmosphere, wherein, in a penetration portion through which the tie rod bolt hermetically penetrates, the movable partition wall has a tubular guide portion that abuts against the tie rod bolt or an annular member provided on the front shell during forward movement of the power piston (for example, during a full stroke), and an annular sealing portion that is provided in the rear of the guide portion to interrupt communication between the negative pressure chamber and the variable pressure chamber, and the guide portion or the tie rod bolt is provided with a communication portion for communicating the negative pressure chamber to a negative pressure chamber side space to which the front surface of the sealing portion exposes, even in a state in which the guide portion abuts against the annular member.

In the negative pressure type booster device according to the present invention, as described above, the guide portion or the tie rod bolt is provided with the communication portion through which the negative pressure chamber side space exposed by the front surface of the sealing portion communicates with the negative pressure chamber, even in a state in which the guide portion abuts against the annular member. For this reason, even if the guide portion abuts against the annular member during the forward movement of the power piston (for example, during a full stroke), since the above-described communication portion functions, the sealing performance at the contact portion between the guide portion and the annular member cannot be obtained. Thus, it is possible to accurately inspect the sealing performance of the annular sealing portion by the above-described sealing inspection of the annular sealing portion.

Furthermore, since the negative pressure type booster device according to the present invention can be implemented by providing the communication portion in the guide portion or the tie rod bolt, there is no need for a shape change of the booster shell or the guide portion of the booster device (for example, shape changes such as an increase in width (length in the front-back direction) of the booster shell or a decrease in length in the front-back direction of the guide portion). Therefore, an increase in size of the booster device and a functional decline of the guide portion are not caused.

BRIEF DESCRIPTION OF THE DRAWING FIGURES

DETAILED DESCRIPTION

Figure 1:
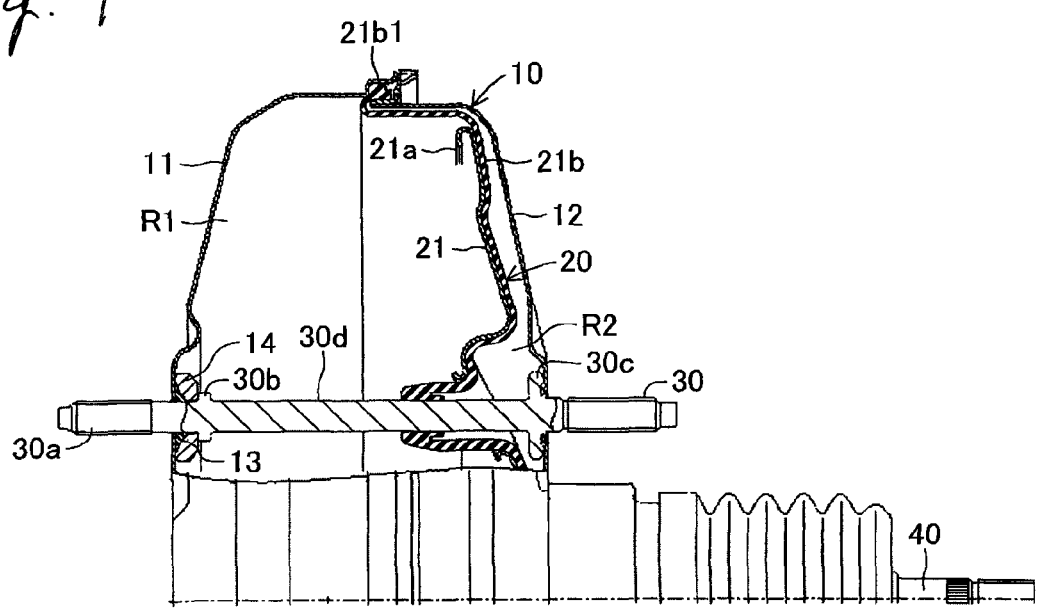
FIG. 1 is a partially cutaway side view illustrating an embodiment of a negative pressure type booster device according to the present invention.
Figure 2:
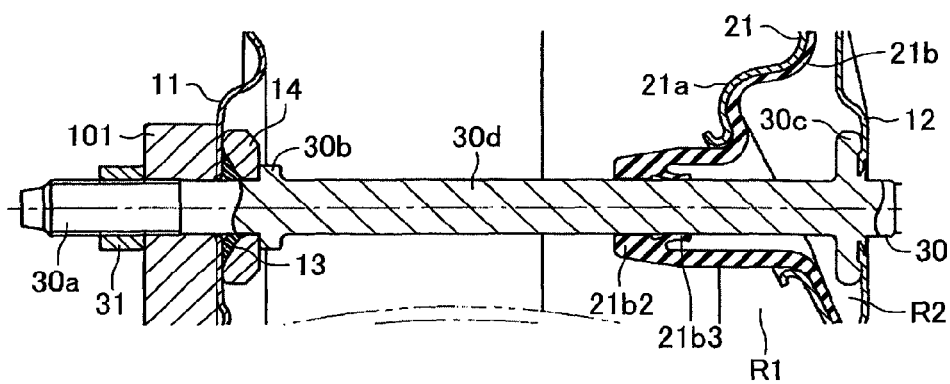
FIG. 2 is an enlarged cross-sectional view of main parts of FIG. 1.

Hereinafter, embodiments of the present invention will be described with reference to the drawings. FIGS. 1 and 2 illustrate an embodiment of a negative pressure type booster device according to the present invention, and the negative pressure type booster device has a booster shell 10, a power piston 20, and a tie rod bolt 30. In addition, the negative pressure type booster device has an input member 40, an output member, a control valve, a key member (since the output member, the control valve, the key member, and the like are well known, these elements are not illustrated) or the like that is assembled to the power piston 20.

As illustrated in FIG. 1, the booster shell 10 is formed by a front shell 11 and a rear shell 12. The front shell 11 and the rear shell 12 are made of a steel plate material and are press-molded. In addition, a negative pressure introduction pipe (not illustrated) is hermetically assembled to the front shell 11 as is well known, and the front shell 11 is configured to be connected to a negative pressure source (for example, an intake manifold of an engine (not illustrated)) through the negative pressure introduction pipe.

The power piston 20 divides the interior of the booster shell 10 into a front negative pressure chamber R1 and a rear variable pressure chamber R2, is movable in the front-back direction, and has a movable partition wall 21 and a hollow valve body (not illustrated). The negative pressure chamber R1 is configured to be connected to the negative pressure source through the negative pressure introduction pipe. Meanwhile, the variable pressure chamber R2 is configured to be connected to the negative pressure chamber or atmosphere as is well known.

The movable partition wall 21 is formed by an annular plate 21a and an annular diaphragm 21b, and is installed to be movable in the front-back direction within the booster shell 10 (an axial direction of the power piston 20). The diaphragm 21b is hermetically interposed by the booster shell 10 at an annular outer circumferential bead portion 21b1 formed on its outer circumferential edge. Furthermore, the diaphragm 21b is hermetically fixed to the outer circumferential portion of a valve body (not illustrated), together with the inner circumferential portion of the plate 21a at an annular inner circumferential bead portion (not illustrated) formed on the inner circumferential edge thereof.

A pair of tie rod bolts 30 is provided (one is illustrated in FIG. 1) to hermetically penetrate through the booster shell 10 and the movable partition wall 21 (the diaphragm 21b). On the front shell side of the tie rod bolt 30, a master cylinder body 101 assembled to the front of the front shell 11 is integrally fixed to a front end portion 30a of the tie rod bolt 30 using a nut 31. Together with the front shell 11, a seal ring 13, and a retainer ring 14 or the like, the master cylinder body 101 is interposed between a front annular flange portion 30b (annular member) provided on the tie rod bolt 30 and the nut 31. In addition, on the rear shell side of the tie rod bolt 30, the rear shell 12 is hermetically fixed to a rear annular flange portion 30c provided in the tie rod bolt 30.

Figure 4:
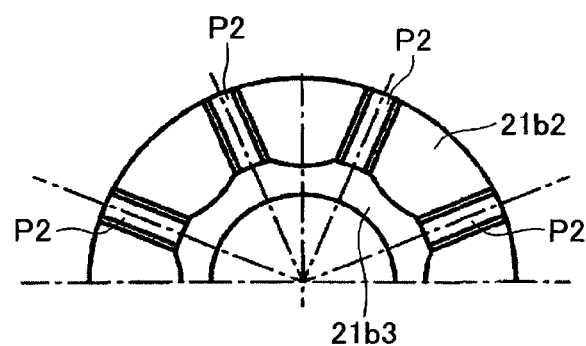
FIG. 4 is a left side view in a free state of the guide portion and the sealing portion illustrated in FIG. 3.

Furthermore, at an intermediate portion of the tie rod bolt 30, a shaft portion 30d of the tie rod bolt 30 hermetically penetrates through the diaphragm 21b, and a tubular guide portion 21b2 and an annular sealing portion 21b3 are provided in the penetration portion. As illustrated in FIG. 4, an inner hole of the guide portion 21b2 has a non-circular shape (an octagonal shape), and the guide portion 21b2 is assembled to be movable to the shaft portion 30d of the tie rod bolt 30 in an axial direction (front-back direction) in the inner hole. The sealing portion 21b3 is formed to protrude rearward at the rear of the guide portion 21b2, an inner hole thereof has a circular shape, and the sealing portion 21b3 is assembled to the shaft portion 30d of the tie rod bolt 30 hermetically and to be movable in the axial direction (front-back direction) in the inner hole.

Figure 3:
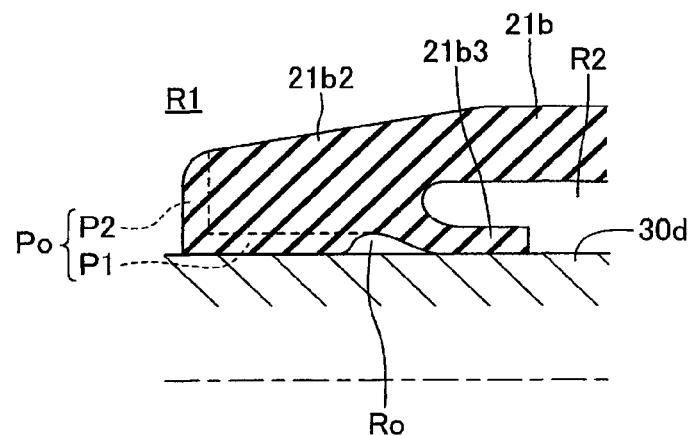
FIG. 3 is an enlarged cross-sectional view of a guide portion and a sealing portion illustrated in FIG. 2.
Figure 5:
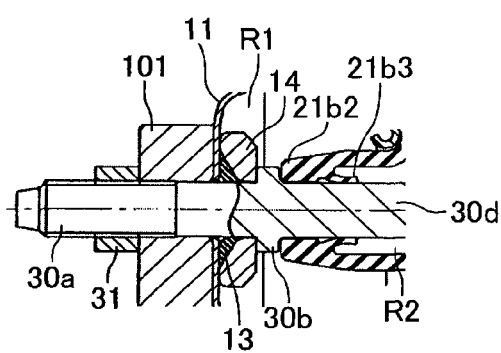
FIG. 5 is an explanatory view of operation when a power piston of the negative pressure type booster device illustrated in FIG. 1 moves forward (a full stroke)
Figure 6:
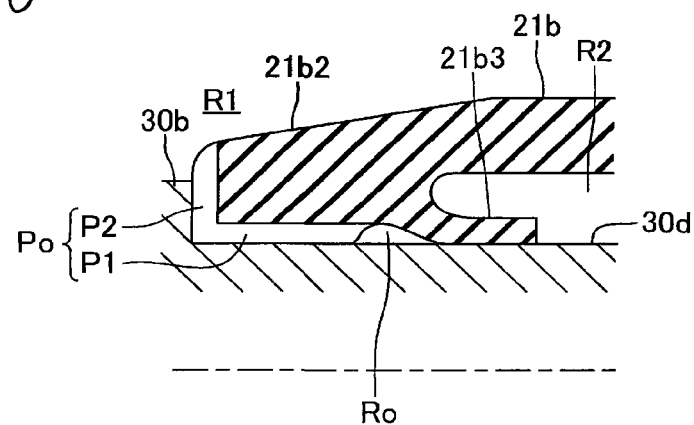
FIG. 6 is an enlarged cross-sectional view of a communication part between the guide portion and the sealing portion illustrated in FIG. 5.

In this embodiment, as illustrated in FIGS. 3 and 5, a communication portion Po is provided in the guide portion 21b2. The communication portion Po allows the negative pressure chamber R1 to communicate with an annular negative pressure chamber side space Ro to which the front surface of the sealing portion 21b3 exposes, not only in the state illustrated in FIGS. 2 and 3 (when the movable partition wall 21 is at the return position), but also in the state illustrated in FIGS. 5 and 6 (when the movable partition wall 21 is at the forward movement position (full stroke position), and the guide portion 21b2 abuts against the annular flange portion 30b), and the communication portion Po is formed by a communication path P1 and a slit P2.

The communication path P1 is formed between the guide portion 21b2 and the shaft portion 30d of the tie rod bolt 30 by the non-circular shape of the inner hole of the guide portion 21b2, extends in the front-back direction, and communicates with the negative pressure chamber side space Ro at the rear end. As illustrated in FIG. 4, a plurality of slits P2 is provided at a front end portion of the guide portion 21b2 and extends in the radial direction of the bolt. As illustrated in FIG. 5, the slits P2 communicate with the communication path P1 at a radially inner end, and communicate with the negative pressure chamber R1 at a radially outer end.

In the negative pressure type booster device of the above-described embodiment, the guide portion 21b2 of the diaphragm 21b is provided with the communication portion Po that allows the negative pressure chamber R1 to communicate with an annular negative pressure chamber side space Ro to which the front surface of the sealing portion 21b3 exposes, even in a state in which the guide portion 21b2 abuts against the annular flange portion 30b of the tie rod bolt 30. For this reason, even if the guide portion 21b2 abuts against the annular flange portion 30b during the forward movement of the power piston 20 (for example, during the full stroke), since the above-described communication portion Po functions, the sealing performance at the contact portion between the guide portion 21b2 and the annular flange portion 30b cannot be obtained. Therefore, in the sealing inspection of the above-described annular sealing portion 21b3, it is possible to accurately inspect the sealing performance of the annular sealing portion 21b3.

Furthermore, the negative pressure type booster device can be implemented by providing the communication portion Po in the guide portion 21b2, and there is no need for a shape change of the booster shell 10 and the guide portion 21b2 (for example, shape changes such as an increase in the width (length in the front-back direction) of the booster shell 10 or a decrease in length in the front-back direction of the guide portion 21b2). Therefore, an increase in size of the booster device and a functional decline of the guide portion 21b2 are not caused.

Figure 7:
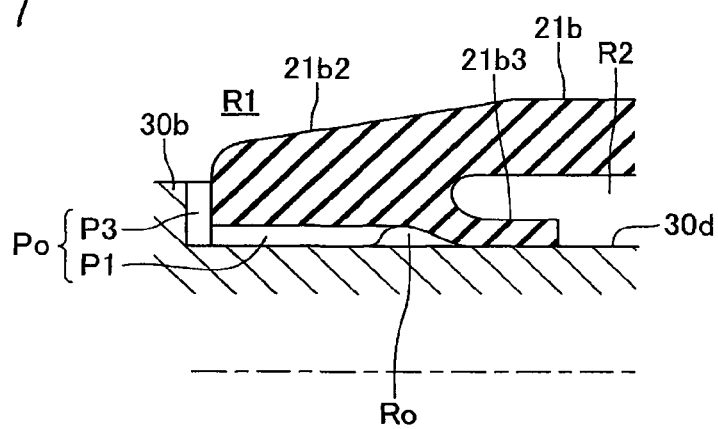
FIG. 7 is an enlarged cross-sectional view of a first modified embodiment corresponding to FIG. 6.

In the above-described embodiment, the embodiment in which the annular flange portion 30b provided in the tie rod bolt 30 is the annular member (against which the guide portion 21b2 abuts at the time of forward movement) of the present invention has been described, however the present invention can be implemented even in an embodiment in which the annular member provided in the front shell 11 (for example, a member that hermetically seals between the front shell and the tie rod bolt) is the annular member of the present invention (against which the guide portion 21b2 abuts at the time of forward movement). Furthermore, in the above-described embodiment, the embodiment in which the communication portion Po is formed by the communication path P1 and the slit P2, however, as in a first modified embodiment illustrated in FIG. 7, the present invention may also be implemented in an embodiment in which the communication portion Po is formed by the communication path P1 and the slit P3 (a slit that is provided at the rear end portion of the annular flange portion 30b, extends in the radial direction of the bolt, and communicates with the communication path P1 at the radially inner end and communicates with the negative pressure chamber R1 at the radially outer end in a state in which the guide portion 21b2 abuts against the annular flange portion 30b).

Figure 8:
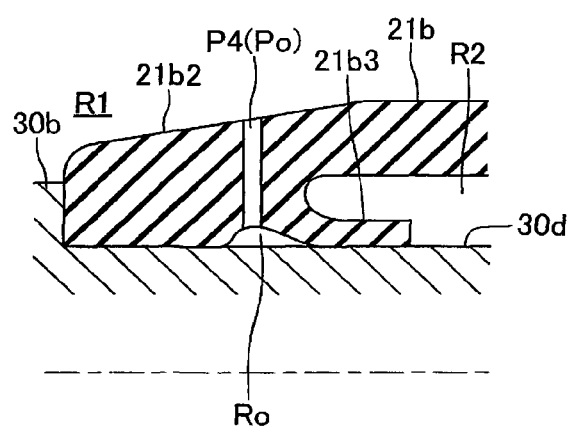
FIG. 8 is an enlarged cross-sectional view of a second modified embodiment corresponding to FIG. 6.
Figure 9:
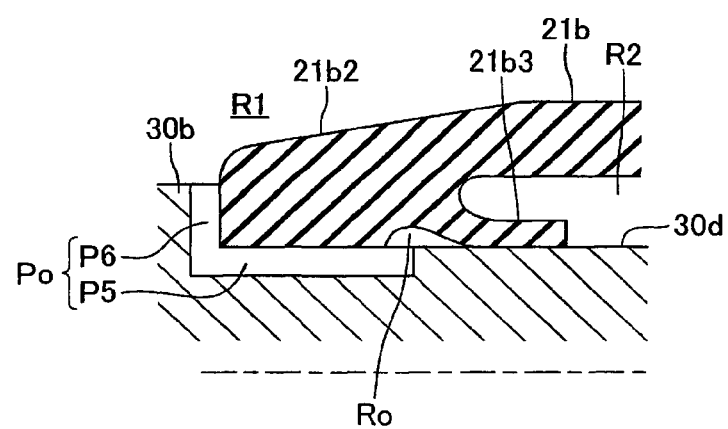
FIG. 9 is an enlarged cross-sectional view of a third modified embodiment corresponding to FIG. 6.

Furthermore, as in a second modified embodiment illustrated in FIG. 8, the present invention can also be implemented in an embodiment in which the communication portion Po is formed by a communication hole P4 that is provided in the guide portion 21b2, communicates with the negative pressure chamber side space Ro at the radially inner end of the bolt, and communicates with the negative pressure chamber R1 at the radially outer end of the bolt. Furthermore, as in a third modified embodiment illustrated in FIG. 9, the present invention can also be implemented in an embodiment in which the communication portion Po is formed by a first slit P5 and a second slit P6. The first slit P5 is provided on the outer circumference of the tie rod bolt 30 and extends in the front-back direction, and communicates with the negative pressure chamber side space Ro at the rear end in the state in which the guide portion 21b2 abuts against the annular flange portion 30b. The second slit P6 is provided in the annular flange portion 30b, extends in the radial direction of the bolt, and in a state in which the guide portion 21b2 abuts against the annular flange portion 30b, the second slit P6 communicates with the first slit P5 at the radially inner end, and communicates with the negative pressure chamber R1 at the radial outward end, thereby allowing the negative pressure chamber side space Ro to communicate with the negative pressure chamber R1 in cooperation with the first slit P5. In the above-described second modified embodiment and third modified embodiment, the inner hole of the guide portion 21b2 can have (a cross-sectional shape of) a circular shape, which can enhance the guidance function of the guide portion 21b2.

What is claimed is:

1. A negative pressure type booster device comprising: a booster shell formed by a front shell and a rear shell; a power piston that divides the interior of the booster shell into a negative pressure chamber and a variable pressure chamber and is movable in a front-back direction; and a tie rod bolt that hermetically penetrates through the booster shell and a movable partition wall included in the power piston and is fixed to the booster shell,
   the negative pressure chamber being configured to be formed between the front shell and the power piston and connected to a negative pressure source, and the variable pressure chamber being configured to be formed between the rear shell and the power piston and connected to the negative pressure chamber or atmosphere,
   wherein, in a penetration portion through which the tie rod bolt hermetically penetrates, the movable partition wall has a tubular guide portion that abuts against the tie rod bolt or an annular member provided on the front shell during forward movement of the power piston, and an annular sealing portion that is provided in the rear of the guide portion to interrupt the communication between the negative pressure chamber and the variable pressure chamber, and
   the guide portion or the tie rod bolt is provided with a communication portion for communicating the negative pressure chamber to a negative pressure chamber side space to which the front surface of the sealing portion exposes, even in a state in which the guide portion abuts against the annular member.

2. The negative pressure type booster device according to claim 1,
   wherein the communication portion is formed by a communication path that is formed between the guide portion and the tie rod bolt, extends in the front-back direction, and communicates with the negative pressure chamber side space at a rear end by a non-circular shape of the inner hole of the guide portion, and a slit that is provided at a front end portion of the guide portion, extends in a radial direction of the bolt, communicates with the communication path at a radially inner end, and communicates with the negative pressure chamber at a radially outer end.

3. The negative pressure type booster device according to claim 1,
   wherein the communication portion is formed by a communication path that is formed between the guide portion and the tie rod bolt, extends in the front-back direction, and communicates with the negative pressure chamber side space at a rear end by a non-circular shape of the inner hole of the guide portion, and a slit that is provided at a rear end portion of the annular member, extends in a radial direction of the bolt, communicates with the communication path at the radially inner end, and communicates with the negative pressure chamber at the radially outer end, in a state where the guide portion abuts against the annular member.

4. The negative pressure type booster device according to claim 1,
   wherein the communication portion is formed by a communication hole that is provided in the guide portion, communicates with the negative pressure chamber side space at the radially inner end of the bolt, and communicates with the negative pressure chamber at the radially outer end of the bolt.

5. The negative pressure type booster device according to claim 1,
wherein the communication portion has a first slit that is provided on the outer circumference of the tie rod bolt, extends in the front-back direction, and communicates with the negative pressure chamber side space at the rear end in a state in which the guide portion abuts against the annular member, and a second slit that is provided on the annular member, extends in the radial direction of the bolt, communicates with the first slit at the radially inner end, communicates with the negative pressure chamber at the radially outer end in a state in which the guide portion abuts against the annular member, and thus allows the negative pressure chamber side space to communicate with the negative pressure chamber in cooperation with the first slit.

* * * * *